United States Patent Office 3,426,741
Patented Feb. 11, 1969

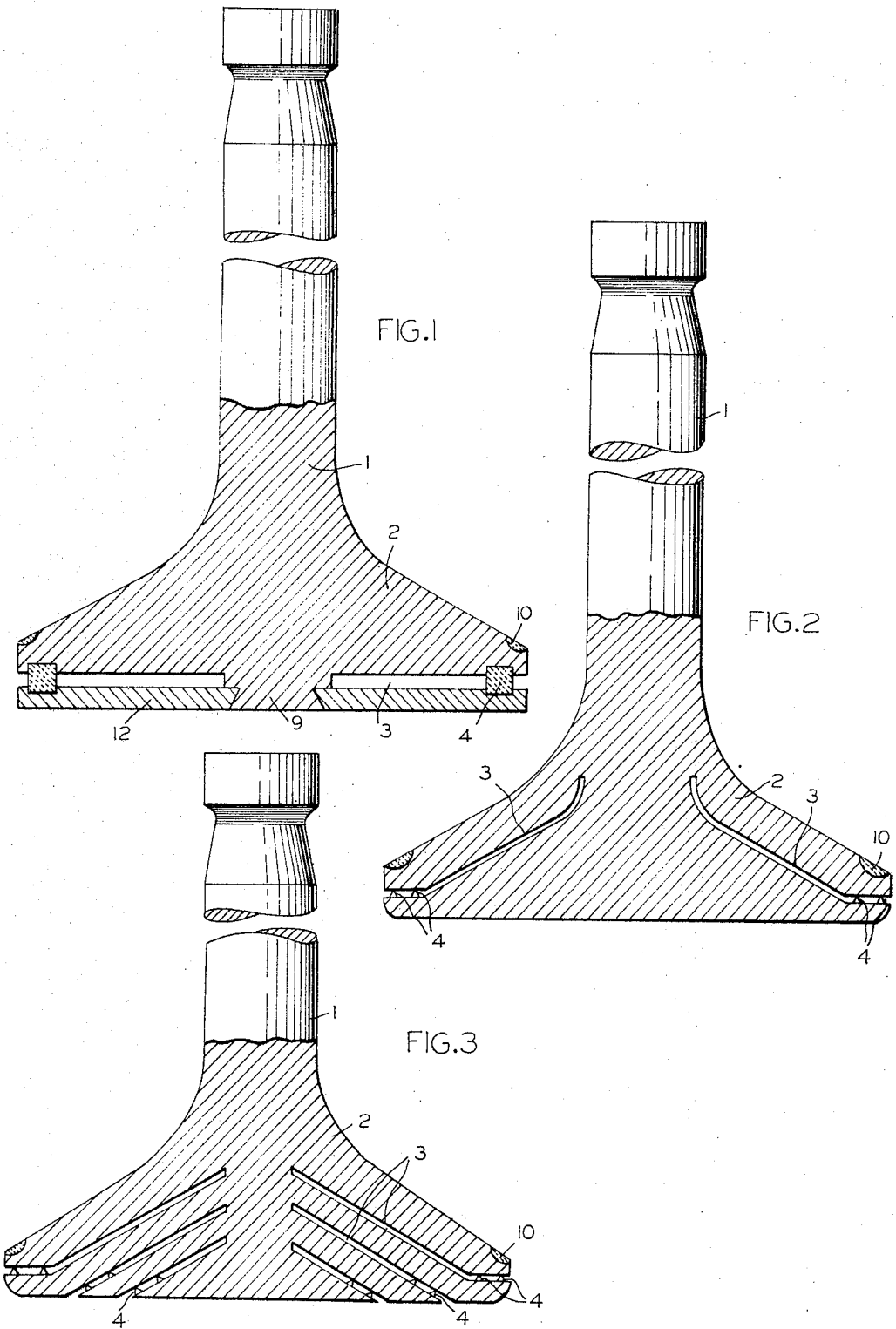

3,426,741
DIESEL ENGINE POPPET VALVE
Thomas E. Haagen, Box 13, Nynashamn, Sweden
Continuation-in-part of application Ser. No. 540,661,
Apr. 6, 1966. This application Apr. 3, 1968, Ser.
No. 718,594
U.S. Cl. 123—188  4 Claims
Int. Cl. F01l *3/20;* F16k *25/00, 51/00*

ABSTRACT OF THE DISCLOSURE

This invention relates to a diesel engine poppet valve that includes a stem portion, a head portion connected to the stem portion, at least one completely enclosed and annularly disposed chamber located within the mass of metal that comprises the head portion and at least one annular ceramic ring positioned in said head so as to completely enclose and seal said chamber against the entrance of hot combustion gases.

Related case

This application is a continuation-in-part of my prior application Ser. No. 540,661 filed Apr. 6, 1966.

Background

In different types of combustion engines the need arises to limit the temperature in highly stressed components, particularly at the sealing surfaces of the exhaust gas valves. This need is particularly important in diesel engines and is accentuated if the engine is operating on high-viscosity fuel, which is desirable in view of the fact that this type of fuel is considerably cheaper than the more refined fuel. As a matter of fact, the price difference is so great that diesel fuel has been used even though it is known that the use of the cruder fuel will entail an increase of the service and maintenance costs of the engine, primarily because the useful life of the exhaust gas valves is considerably shortened.

Aside from the conventional reasons for limiting the temperature at the exhaust gas valves (i.e. to attain a lesser reduction of the mechanical strength arising due to the high exhaust gas temperature at high power outputs) another reason exists for having the valves of diesel engines efficiently cooled. This reason is the chemical and mechanical attacks on sealing surfaces of the valves which arise on account of the comparatively high contents of certain contaminants in diesel fuel. The most important contaminant is vanadium forming vanadium pentoxide, which compound has a heavy corroding influence on the valve sealing surfaces if the temperature is too high.

Heretofore four different approaches have been employed to tackle the above problems.

The first approach involves the use of more resistant materials for the valve proper and for its sealing surfaces. In the first place coatings of hard metal such as Stellite have been used. However, this approach has not been very successful.

A second approach has been to use chemical additives in the fuel. Apart from not being economical, this solution has proved to be of very questionable value.

The third approach involves adoption of a design which is well known in carburator-equipped combustion engines, namely cooling the valves with sodium. It has, however, turned out that such cooling action is quite insufficient for diesel engines operating on high-viscosity fuel.

The fourth approach involves the introduction of a circulating cooling agent, in most cases water into the valve proper. For this purpose the valve stem is provided with an axial bore into which a tube is inserted, the outer diameter of which is considerably less than that of the bore. The cooling agent is introduced through the tube and returns through the passage of annular cross-section formed around the tube. While such an arrangement yields satisfactory results as far as the cooling of the valve seats is concerned it has the important disadvantage of greatly increasing the cost of manufacturing the valves. In addition, the need for flexible hoses to each valve increases the leaking risks. A third drawback is that since the valve stem is also cooled it becomes subjected to an increased wearing caused by the condensation thereon of sulphur compounds.

Summary of the invention

The present invention involves providing poppet valves with at least one heat insulating chamber, and sealing the heat insulating chamber with an annular ceramic ring so as to provide an arrangement capable of limiting the temperature of the sealing surfaces of the valve without any of the disadvantages or limitations characterizing the prior art approaches.

The drawings

Each of the drawings is a longitudinal cross-sectional view through the axis of different embodiments of a valve in accordance with this invention.

Description of the preferred embodiments

In all of the drawings, reference numeral 1 refers to the stem and numeral 2 to the head of a disk valve, e.g. an exhaust gas valve for a diesel engine. In accordance with my invention the valve head 2 (with an annular protective Stellite coating 10) has at least one heat-insulating chamber 3 disposed in the main portion of the valve head 2. Heat insulating chambers 3 can be considered as heat shields. In FIGURE 1 the chamber shown as being approximately perpendicular to the axis of the stem, while in FIGURE 2 the chamber 3 is disposed at an angle to the axis of the stem. In FIGURE 3 there are a plurality of heat insulating chambers 3 disposed at an angle to the axis of the stem.

The heat insulating chambers may be either empty, or filled with a heat insulating material such as asbestos or the like.

It will be noted that the heat insulating chambers are provided with annular spacer rings 4 adjacent their outer peripheries. These spacer rings preferably consist of some strong, hard ceramic material, such as porcelain or fired clay, and serve several functions. First of all, such spacer rings seal the outer periphery of the heat insulating chambers against the entrance of hot combustion gases. Secondly, when asbestos is placed in the heat insulating chamber, the spacer rings prevent the asbestos from being crushed and compacted by the mechanical pressure shocks that are encountered when the valve is in operation. The spacer rings also assist the valve in withstanding vibration and shocks.

A heat insulating chamber may be provided with one spacer ring (see FIGURE 1) or with several spacer rings (FIGURES 2 and 3) in order to lend added support throughout the heat insulating chamber.

In conclusion, while the foregoing specification and drawing describe the construction, operation and use of some preferred embodiments of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly, it is intended to encompass all changes, variations, modifications and equivalents falling within the scope of the appended claims.

What is claimed is:
1. A poppet valve for diesel engines comprising in combination:
    (a) a stem portion,
    (b) a head portion connected to said stem portion,
    (c) at least one completely enclosed and annularly disposed chamber located within the mass of metal that comprises the head portion, and
    (d) at least one annular ceramic ring positioned in said head so as to completely enclose and seal said chamber against the entrance of hot combustion gases.
2. A poppet valve according to claim 1 wherein there are a plurality of completely enclosed and annularly disposed chambers.
3. A valve according to claim 1 wherein said chamber is filled with asbestos material.
4. A valve according to claim 2 wherein said chamber is filled with asbestos material.

References Cited
UNITED STATES PATENTS

| | | | |
|---|---|---|---|
| 698,474 | 4/1902 | Ebbs | 123—41.41 |
| 1,601,274 | 9/1926 | Warrington. | |
| 1,868,138 | 7/1932 | Fisk | 123—188 |
| 1,873,119 | 8/1932 | Griswold | 123—41.41 X |
| 2,787,992 | 4/1957 | Flint | 123—188 |

FOREIGN PATENTS

| | | |
|---|---|---|
| 410,467 | 5/1934 | Great Britain. |
| 334,864 | 1/1936 | Italy. |

AL LAWRENCE SMITH, *Primary Examiner.*

U.S. Cl. X.R.

123—41.16; 251—334; 98—62